(12) United States Patent
Grechishnikova et al.

(10) Patent No.: US 11,561,315 B2
(45) Date of Patent: Jan. 24, 2023

(54) SYSTEMS AND METHODS FOR IDENTIFYING GEOSTRUCTURAL PROPERTIES AS A FUNCTION OF POSITION IN A SUBSURFACE REGION OF INTEREST

(71) Applicant: CHEVRON U.S.A. INC., San Ramon, CA (US)

(72) Inventors: Alena Grechishnikova, Houston, TX (US); Shane J. Prochnow, Fulshear, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/219,680

(22) Filed: Mar. 31, 2021

(65) Prior Publication Data

US 2022/0317324 A1    Oct. 6, 2022

(51) Int. Cl.
*G01V 1/50* (2006.01)
*G01V 1/30* (2006.01)
*G06N 20/00* (2019.01)
*G01V 1/28* (2006.01)

(52) U.S. Cl.
CPC .............. *G01V 1/50* (2013.01); *G01V 1/282* (2013.01); *G01V 1/301* (2013.01); *G06N 20/00* (2019.01); *G01V 2210/646* (2013.01)

(58) Field of Classification Search
USPC ........................................................ 702/6
See application file for complete search history.

(56) References Cited

U.S. PATENT DOCUMENTS

| | | |
|---|---|---|
| 2004/0117121 A1* | 6/2004 | Gray ................. G01V 1/30 702/11 |
| 2017/0275970 A1 | 9/2017 | Crawford et al. |
| 2019/0080122 A1* | 3/2019 | Camargo ............. G01V 99/005 |
| 2019/0094403 A1 | 3/2019 | Prochnow et al. |
| 2019/0094414 A1 | 3/2019 | Prochnow et al. |
| 2019/0120998 A1 | 4/2019 | Prochnow et al. |
| 2019/0179983 A1 | 6/2019 | Prochnow et al. |
| 2019/0249534 A1* | 8/2019 | Hoeink ................. G01V 1/50 |
| 2021/0010359 A1* | 1/2021 | Ruhle .................. E21B 47/10 |
| 2021/0326721 A1* | 10/2021 | Zhang .................. G06N 20/20 |

OTHER PUBLICATIONS

Chopra et al., "Volumetric curvature attributes for fault/fracture characterization," First Break (Jul. 2007), vol. 25, pp. 35-46.

(Continued)

*Primary Examiner* — Paul D Lee
(74) *Attorney, Agent, or Firm* — Sheppard, Mullin, Richter & Hampton LLP

(57) ABSTRACT

Systems and methods are disclosed for identifying and displaying geostructural properties as a function of lithology, horizons, and faults interpreted from well and seismic data. Exemplary implementations may include obtaining an initial fracture distribution grid model; obtaining training structural deformation data; obtaining training subsurface lithology parameter data; obtaining training fracture attribute data; and training the initial fracture distribution grid model to generate a trained fracture distribution grid model.

19 Claims, 8 Drawing Sheets

(56) References Cited

OTHER PUBLICATIONS

Gao, Dengliang, "Integrating 3D seismic curvature and curvature gradient attributes for fracture characterization: Methodologies and interpretational implications," Geophysics (Mar.-Apr. 2013), vol. 78, No. 2, 17 pages.
Grechishnikova, Alena, "Discrete fracture network model developed from a high resolution LIDAR outcrop survey of a naturally fractured unconventional Niobrara reservoir, Denver Basin," URTeC Paper 2430655 (AAPG/SEG/SPE) (2016) https://doi.org/10.15530/URTEC-2016-2430655, 13 pages.
Grechishnikova, A., "Integrated application of a high resolution LIDAR outcrop survey of an unconventional Niobrara reservoir, Denver Basin, Colorado," First Break, vol. 34, No. 5, May 2016, Special Topic, p. 65-71.
Grechishnikova, Alena, "Niobrara discrete fracture network: from outcrop surveys to subsurface reservoir models," Ph.D. thesis, Colorado School of Mines (2017), https://hdl.handle.net/11124/171851, 143 pages.
Grechishnikova, Alena, "Niobrara discrete fracture networks: from outcrop surveys to subsurface reservoir models," SEG Technical Program Expanded Abstracts 2017, p. 3267-3271. https://doi.org/10.1190/segam2017-17632715.1.
Grechishnikova, A., "Fracture network characterization and modeling for improved mine efficiency," ARMA (American Rock Mechanics Association) / DFNE 18-1440 (International Discrete Fracture Network Engineering Conference), Seattle, Washington, 10 pages.
Grechishnikova, A., "Integration of digital outcrop and multisource subsurface data for reservoir modeling and sweet spot mapping in unconventional resource plays," American Association of Petroleum Geologists (AAPG) Annual Convention and Exhibition (ACE), Salt Lake City, Utah (Jul. 23-25, 2018) Abstract Only 1 page.
Grechishnikova, A., "Microseismic monitoring in unconventional reservoirs: are natural fractures hiding in plain sight?," First Break, vol. 36, No. 4, Apr. 2018, Special Topic, p. 83-89.
Grechishnikova, A., "Natural fracture networks in unconventional reservoirs for improved development strategies: Niobrara play case study," ARMA (American Rock Mechanics Association) / DFNE 18-1279 (International Discrete Fracture Network Engineering Conference), Seattle, Washington (2018) 6 pages.
Maerten et al., "Three-dimensional geomechanical modeling for constraint of subseismic fault simulation," American Association of Petroleum Geologists Bulletin (Sep. 2006), vol. 90, No. 9, 1337-1358.
Maerten, Frantz, "Geomechanics to solve geological structure issues: forward, inverse and restoration modelling," Geophysics Ph.D. thesis (Nov. 19, 2010), University of Montpellier II Sciences et Techniques Du Languedoc, 457 pages.
Menescal et al, "Advanced Geomechanical Techniques for Natural Fracture Prediction," European Association of Geoscientists & Engineers, Conference Proceedings, Fifth International Conference on Fault and Top Seals, Sep. 2019, vol. 2019, p. 1-5.
Neves et al, "Detection of potential fractures and small faults using seismic attributes," The Leading Edge (Sep. 2004), vol. 23, 903-906.
Phillips, H., et al, "Natural Fracture Prediction for Discrete Fracture Modelling," European Association of Geoscientists & Engineers, Conference Proceedings, 76th EAGE Conference and Exhibition, Jun. 2014, vol. 2014, p. 1-5.
Questiaux et al., "Fractured reservoirs with fracture corridors," Geophysical Prospecting (2010), 58, pp. 279-295.
Salimi et al, "Upscaling in partially fractured oil reservoirs using homogenization," SPE 125559/EAGE Reservoir Characterisation and Simulation Conference, Abu Dhabi (Oct. 2009), 26 pages.
Extended European Search Report dated Aug. 17, 2022 for European Application No. 22165601.0.
El Ouahed et al., "Application of artificial intelligence to characterize naturally fractured zones in Hassi Messaoud Oil Field, Algeria," Journal of Petroleum Science and Engineering 49 (2005) pp. 122-141.
Ouenes, Ahmed, "Practical application of fuzzy logic an neural networks to fractured reservoir characterization," Computers & Geosciences 26 (2000) pp. 953-962.
Qian et al., "Intelligent prediction and integral analysis of shale oil and gas sweet spots," Petroleum Science (2018) 15:744-755; https://doi.org/10.1007/s12182-018-0261-y.

* cited by examiner

SYSTEMS AND METHODS FOR IDENTIFYING GEOSTRUCTURAL PROPERTIES AS A FUNCTION OF POSITION IN A SUBSURFACE REGION OF INTEREST

FIELD OF THE DISCLOSURE

The present disclosure relates to systems and methods for identifying geostructural properties as a function of position in a subsurface region of interest.

SUMMARY

Implementations of the present disclosure include systems, methods, devices, and apparatuses capable of identifying and displaying geostructural properties as a function of lithology, horizons, and faults interpreted from well and seismic data. In accordance with the technology described herein, a computer-implemented method for identifying and displaying geostructural properties as a function of lithology, horizons, and faults interpreted from well and seismic data is disclosed. The computer-implemented method may be implemented in a computer system that includes a physical computer processor and non-transient electronic storage. The computer-implemented method may include a number of operations. One operation may include obtaining an initial fracture distribution grid model. Another operation may include obtaining training structural deformation data. The training structural deformation data may quantify one of geostructural characteristics and structural deformation characteristics as a function of position in the subsurface region of interest. Yet another operation may include obtaining training subsurface lithology parameter data. The training subsurface lithology parameter data may quantify lithological characteristics as a function of position in the subsurface region of interest. Another operation may include obtaining training fracture attribute data. The training fracture attribute data may specify fracture attribute values as a function of position in the subsurface region of interest. Yet another operation may include training the initial fracture distribution grid model to generate a trained fracture distribution grid model predicting natural fracture network attribute values based on the training structural deformation data, the training subsurface lithology parameter data, and the training fracture attribute data.

In implementations, the training structural deformation data may include seismic data.

In implementations, the seismic data may include one of a fault type, fault angle, orientation, heave, vertical throw, horizontal throw, and stratigraphic throw.

In implementations, the training structural deformation data may include well log data acquired from multiple well logs.

In implementations, the training subsurface lithology parameter data may include one of a facies type, lithology, bedding character, porosity, and permeability.

In implementations, the computer-implemented method may further include training the initial fracture distribution grid model to generate a trained fracture distribution grid model predicting the natural fracture network attribute values as a function of position based on the fracture intensity within the training subsurface region.

In implementations, the computer-implemented method may further include training the fracture distribution grid model to generate a trained fracture distribution grid model predicting the natural fracture network attribute values as a function of position based on a correlation between a distance from the fault location and the fracture intensity.

In implementations, the computer-implemented method may further include obtaining a surface curvature within the training subsurface region. Another operation may include training the initial fracture distribution grid model to generate a trained fracture distribution grid model predicting the natural fracture network attribute values as a function of position based on the surface curvature.

In implementations, the training subsurface region may include observable lithology, bedding character, faults/folds, and fractures.

In implementations, the fracture distribution grid models may include a machine learning model.

In implementations, the machine learning model may include one of a random forest, a convolutional neural network, and a regression.

In implementations, the computer system may further include a graphical user interface. The computer-implemented method may further include obtaining target structural deformation data. The target structural deformation data may quantify one of geostructural characteristics and structural deformation characteristics as a function of position in the subsurface region of interest. Another operation may include obtaining target subsurface lithology parameter data. The target subsurface lithology parameter data may quantify lithological characteristics as a function of position in the subsurface region of interest. Yet another operation may include generating predicted natural fracture network attribute values within the subsurface region of interest as a function of position in the subsurface region of interest based on the target structural deformation data and the target subsurface lithology parameter data. Another operation may include displaying the predicted natural fracture network attribute values as a predicted fracture analysis grid.

In accordance with one aspect of the technology described herein, a computer-implemented method for identifying and displaying geostructural properties as a function of seismic horizon and fault structural deformation data is disclosed. The computer-implemented method may include a number of operations. The computer-implemented method may be implemented in a computer system that includes a physical computer processor, non-transient electronic storage, and a graphical user interface. The computer-implemented method may include a number of operations. One operation may include obtaining a trained fracture distribution grid model. Another operation may include obtaining target structural deformation data. The target structural deformation data may quantify one of geostructural characteristics and structural deformation characteristics as a function of position in the subsurface region of interest. Yet another operation may include obtaining target subsurface lithology parameter data. The target subsurface lithology parameter data may quantify lithological characteristics as a function of position in the subsurface region of interest. Another operation may include determining predicted natural fracture network attribute values as a function of position in the subsurface region of interest based on the target structural deformation data, the target subsurface lithology parameter data, and the target fracture attribute data. Yet another operation may include charting the predicted natural fracture network attribute values as a predicted fracture analysis grid.

In implementations, the computer-implemented method of may further include training the trained fracture distribution grid model to predict the natural fracture network attribute values as a function of position based on the fracture spacing/density/intensity within a training subsurface region.

In implementations, the computer-implemented method may further include training the fracture distribution grid model to predict the natural fracture network attribute values as a function of position based on a correlation between a distance from a fault/fold location and a fracture intensity of a training subsurface region.

In implementations, the subsurface region of interest encompasses multiple well sites.

In implementations, determining the predicted natural fracture network attribute values within the subsurface region of interest may include correlating target structural deformation data, target subsurface lithology parameter data, and an average distance from the fault/fold location.

In implementations, the fracture distribution grid model may include a machine learning model.

In accordance with one aspect of the technology described herein, a system for identifying fracture attribute values as a function of position in the subsurface region of interest is disclosed. The system may include a data store, a graphical user interface, and a physical computer processor configured by machine readable instructions to perform a number of operations. One operation may include obtaining a trained fracture distribution grid model. Another operation may include obtaining target structural deformation data. The target structural deformation data may quantify one of geostructural characteristics and structural deformation characteristics as a function of position in the subsurface region of interest. Yet another operation may include obtaining target subsurface lithology parameter data. The target subsurface lithology parameter data may quantify lithological characteristics as a function of position in the subsurface region of interest. Another operation may include determining predicted fracture attribute values as a function of position in the subsurface region of interest based on the target structural deformation data, the target subsurface lithology parameter data, and the target fracture attribute data. Yet another operation may include displaying the predicted fracture attribute values as a predicted fracture analysis grid.

In accordance with one aspect of the technology described herein, a non-transitory computer-readable storage medium having instructions embodied thereon is disclosed. The instructions may be executable by a physical computer processor to perform a method for identifying and displaying geostructural properties as a function of seismic horizon and fault structural deformation data. The method may include a number of operations. One operation may include obtaining a trained fracture distribution grid model. Another operation may include obtaining target structural deformation data. The target structural deformation data may quantify one of geostructural characteristics and structural deformation characteristics as a function of position in the subsurface region of interest. Yet another operation may include obtaining target subsurface lithology parameter data. The target subsurface lithology parameter data may quantify lithological characteristics as a function of position in the subsurface region of interest. Another operation may include determining predicted fracture attribute values as a function of position in the subsurface region of interest based on the target structural deformation data, the target subsurface lithology parameter data, and the target fracture attribute data.

These and other features and characteristics of the present technology, as well as the methods of operation and functions of the related elements of structure and the combination of parts, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the presently disclosed technology. As used in the specification and in the Claims, the singular form of "a", "an", and "the" include plural referents unless the context clearly dictates otherwise.

The technology disclosed herein, in accordance with various implementations, is described in detail with reference to the following figures. The drawings are provided for purposes of illustration and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1:
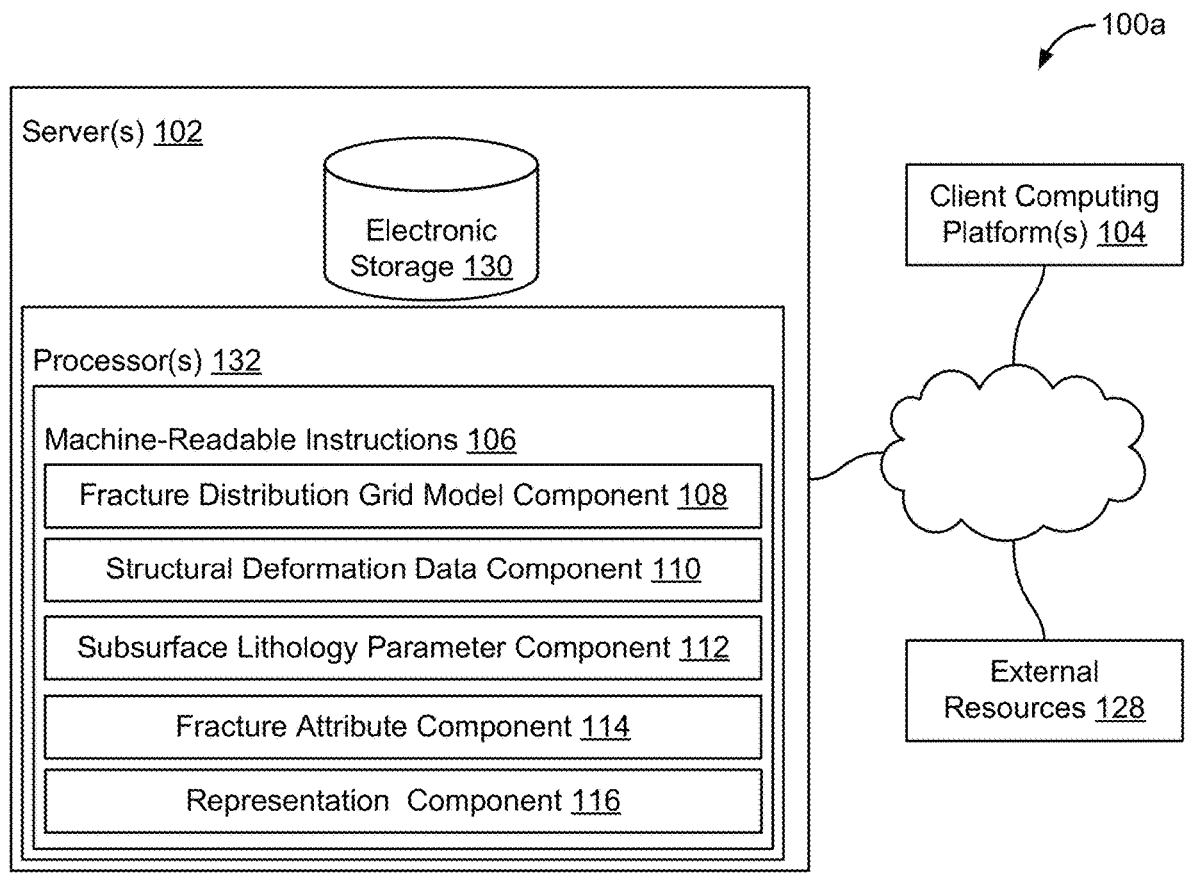
FIG. 1 shows a system configured for identifying geostructural properties as a function of position in a subsurface region of interest, in accordance with some implementations.

Natural subsurface geological fractures are traditionally predicted stochastically from discrete control data observations, such as image log or core data and interpolated in geographic or three dimensional space to make continuous approximations of predictions that naturally carry over uncertainty inherent to the interpolation procedures. There exists no practical methodology to predict natural fractures for subsurface applications from continuous data sources, like seismic reflector horizons, that require no stochastic interpolation to approximate data distributions between fixed observation points in space. Existing approaches also do not combine, or otherwise merge, the multiple sources of empirical predictions and uncertainty to generate geostructural property prediction probability distributions as a function of relative position to observable, primary geostructural features in a subsurface region of interest. Furthermore, these approaches generally ignore spatial locations of the observation data relative to related and readily observable larger order geostructural features and any spatial autocorrelation in the data not accounted for by covariates. Many of the available purely statistical approaches that are not augmented by empirical spatial geolocation with geostructural features also assume statistical independence of randomly selected samples, even though some subsurface phenomena is significantly autocorrelated. These deficiencies in traditional approaches lend to error in predicting subsurface features, including location, presence, and characteristics of hydrocarbon deposits.

Features of the present disclosure provide a combined empirical and machine learning-based method for predicting geostructural properties of natural subsurface fracture networks built on a combination of data and approaches that include structural analysis of seismic horizons calibrated to machine learned predictions of natural fracture attributes from other geologic features. The combined model can be trained using a set of empirical relationships between the observable structural features in the seismic, such as faults and folds, and the natural fracture intensity and other desired attributes. For example, unique empirical relationships can be used to correlate factors known to impact the natural fracture distribution and character, such as reservoir mineralogy and bed thickness, to features identified through geophysical imaging and/or well data analysis. In some implementations of the present disclosure, this correlation may be used to generate a natural fracture density/intensity and/or analysis grid map across a region of interest. For example, the region of interest may encompass multiple wells, and may be at the scale of a hydrocarbon producing field or basin. The machine learning component of the model can be trained, tuned, and calibrated using data collected from discrete sample observations, such as well data (e.g., core, petrophysical data and wireline logs, image logs, mud logs, completion design, well spacing, wellbore tortuosity, production logs, mud logs), field outcrop observations, digital surveys, measurements, and/or analysis. The trained machine learning model can be applied to seismic and/or well log data collected from the region of interest to generate a calibrated natural fracture intensity and/or analysis grid that provides a controlled predicted distribution of natural fractures in the subsurface region of interest, and results in an improved and reliable predictor of subsurface reservoir connectivity, hydrocarbon holding capacity, and hydrocarbon production performance.

The presently disclosed technology may be used as part of a fault prediction tool to reduce drilling and/or development hazards. In implementations, the presently disclosed technology can be used to generate seismic while drilling (SWD) and enhanced oil recovery (EOR) containment probability maps, interzone natural fracture connectivity probability maps, and distribution patterns for local discrete fracture network (DFN) models and reservoir simulations. In some implementations, the presently disclosed technology may be used to land, design, and manage wells through their lives and for secondary opportunities like EOR selection. Unconventional assets will especially benefit from the presently disclosed technology, as there are no known methodologies to represent natural fractures across large areas of interest. For example, the fracture attribute data may be used to better estimate reservoir performance.

Reference will now be made in detail to various implementations, examples of which are illustrated in the accompanying drawings. In the following detailed description, numerous details may be set forth in order to provide a thorough understanding of the present disclosure and the implementations described herein. However, implementations described herein may be practiced without such details. In other instances, some methods, procedures, components, and apparatuses may not be described in detail, so as not to unnecessarily obscure aspects of the implementations.

Disclosed below are methods, systems, and computer readable storage media that may identify geostructural properties as a function of position in a subsurface region of interest. A subsurface region of interest may include any area, region, and/or volume underneath a surface. Such a region may include, or be bounded by, a water surface, a ground surface, and/or another surface. In some implementations, the subsurface region of interest may encompass multiple well sites. In implementations, the subsurface region of interest may include observable lithology, bedding character, faults, folds, fractures, and/or other features.

FIG. 1 illustrates a system 100 configured for identifying geostructural properties as a function of position in a subsurface region of interest, in accordance with some implementations. In implementations, system 100 may identify geostructural properties as a function of position in the subsurface region of interest based on structural deformation data and/or subsurface lithology parameter data. The geostructural properties may include natural fracture intensity, natural fracture attributes, and/or other geostructural properties. In some implementations, system 100 may include a server 102. Server(s) 102 may be configured to communicate with a client computing platform 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include an instruction component. The instruction components may include computer program components. The instruction components may include a fracture distribution grid model component 108, a structural deformation data component 110, a subsurface lithology parameter component 112, a fracture attribute component 114, a representation component 116, and/or other instruction components.

Fracture distribution grid model component 108 may be configured to obtain an initial fracture distribution grid model. The initial fracture distribution grid model may be obtained from the data store and/or another source. The initial fracture distribution grid model may be based on machine learning techniques to map at least one variable to at least another variable. For example, the initial fracture distribution grid model may receive structural deformation data, subsurface lithology parameter data, and/or other data as input and output fracture attribute data. The initial fracture distribution grid model may be "untrained" or "unconditioned," indicating it may not estimate an output based on the input as accurately as a "trained" or "conditioned" model.

In some implementations, an initial fracture distribution grid model may be trained to generate a trained fracture distribution grid model. The initial fracture distribution grid model may be trained using training data. The training data may include training structural deformation data, training subsurface lithology parameter data, training fracture attribute data, and/or other data, as will be described in greater detail below. The training data may be derived from seismic data, well data, and/or other data. Seismic data may include fault type, fault angle, orientation, heave, vertical throw, horizontal throw, stratigraphic throw, structural attribute data including curvature data, fault property data, horizon curvature data, tectonic data including basement fault data and region stress data, and/or other seismic data. The seismic data may be collected from multiple seismic data sites/surveys (i.e., on a pad or regional scale) and correspond to different geophysical collection methods (i.e., 2D seismic, 3D seismic, multicomponent 3D seismic, time-lapse (4D) seismic, microseismic, VSP, and the like). In some implementations, seismic data may be augmented to include well data. Well data may include fracture data, petrophysical data, wireline logs, mud logs, completion design, well spacing, wellbore tortuosity, production data, breakdown pressure data, and/or other data. Other input data may include a basin model, a stress model, outcrop data including fracture measurements, fold and fault measurement, lithology analysis, bedding thickness and heterogeneity, and/or other data.

The initial fracture distribution grid model may include one or more components of a random forest, a convolutional neural network, a regression, and/or other machine learning techniques. It should be appreciated that other fracture distribution grid models may include, for example, convolutional neural networks, reinforcement learning, transfer learning, and/or other machine learning techniques. In some implementations, the fracture distribution grid model may include and/or rely on a basin model, a stress model, and/or other models. In one example, the fracture distribution grid model may be a supervised machine learning model. In one example, the fracture distribution grid model may be an unsupervised machine learning model.

As an example of a machine learning technique, random forest machine learning may have a low risk of overfitting, may allow extreme randomization, and may be very iterative. Random forest may be a modification of bootstrap aggregation that builds on a large collection of de-correlated regression trees and then averages them. Bootstrap aggregation may average many noisy but unbiased models to reduce prediction variance. Regression trees may be appropriate for bootstrap aggregation, because they can capture complex interaction structure. The random forest machine learning may use many boot strap sets and many regression trees to generate many predictions. The predictions may be averaged together to provide a trained fracture distribution grid model.

Referring back to fracture distribution grid model component 108, training the initial fracture distribution grid model may include applying the initial fracture distribution grid model to the training structural deformation data, training subsurface lithology parameter data, and/or training fracture attribute data to generate a first iteration of fracture attribute data. The initial fracture distribution grid model may be adjusted to more accurately estimate the fracture attribute data based on differences between the first iteration of fracture attribute data and the training fracture attribute data that correspond to the training data. This is repeated numerous times until the initial fracture distribution grid model is "trained," i.e., it is able to output fracture attribute data that are consistently within a threshold of the training fracture attribute data. In some implementations, the threshold may depend on the speed of the fracture distribution grid model, resources used by the fracture distribution grid model, and/or other optimization metrics. This threshold may be based on an average of values, a maximum number of values, and/or other parameters. Other metrics may be applied to determine that the fracture distribution grid model is "conditioned" or "trained."

The trained fracture distribution grid model may be able to predict natural fracture network attributes by recognizing patterns in the training data. In implementations, fracture attribute data may include the natural fracture network attributes. In some implementations, the trained fracture distribution grid model may have generated a linear or non-linear relationship between the input data and the natural fracture network attributes. In implementations, the various input data may be weighted differently. For example, the structural deformation data may have a first weight in the relationship, and the subsurface lithology parameter data may have a second weight in the relationship. In some implementations, the weighting may be more granular. For example, different types of structured data may be weighted differently (e.g., well spacing may be weighted differently than completion design, which may be weighted differently than fault orientation). In other words, it should be appreciated that each type of input data (e.g., structural deformation data, subsurface lithology parameter data, and fracture attribute data) may have a sub-type of data that is weighted differently (e.g., well spacing sub-type and fault orientation sub-type for a structural deformation data type).

The natural fracture network attributes as a function of position in the subsurface region of interest may be predicted, or generated, based on applying structural deformation data, subsurface lithology parameter data, fracture intensity, surface curvature, and/or a correlation between a distance from the structural deformation location and the fracture intensity to the trained fracture distribution grid model.

In implementations, fracture distribution grid model component 108 may be configured to obtain a trained fracture distribution grid model. The trained fracture distribution grid model may be obtained from the data storage and/or another source. As discussed above, the trained fracture distribution grid model may be trained using training data on an initial fracture distribution grid model. The trained fracture distribution grid model may have been trained, as described herein, to predict natural fracture network attributes.

In implementations, fracture distribution grid model component 108 may be configured to generate a trained fracture distribution grid model by training an initial fracture distribution grid model, as discussed above.

In implementations, fracture distribution grid model component 108 may be configured to use dynamic time warping (DTW) based on lithology and sub-seismic fault locations which may improve and/or refine the fracture distribution grid model and resulting target fracture attribute data. In implementations, fracture distribution grid model component 108 may be configured to incorporate fracture size and intensity variations with structural and lithological changes which may improve and/or refine the fracture distribution grid model and resulting target fracture attribute data.

Structural deformation data component 110 may be configured to obtain structural deformation data. In implementations, structural deformation component 110 may be configured to obtain other structural deformation data empirically. The structural deformation data may be obtained from the data store and/or another source. The structural deformation data may be training structural deformation data or target structural deformation data. The training structural deformation data may be used to train the initial fracture distribution grid model. The target structural deformation data may be used to generate target fracture attribute data and/or natural fracture network attributes. The structural deformation data may initially be collected and/or measured via sensors in the subsurface region of interest (e.g., field data) and/or be generated through the use of simulation models (e.g., synthetic data). In implementations, the structural deformation data may initially be collected and/or measured via sensors exposed at the surface or subsurface region of interest (e.g., field data) and/or be generated through the use of simulation models (e.g., synthetic data). The synthetic structural deformation data may be stored. The stored synthetic structural deformation data may be obtained and/or used as part of the training data.

The structural deformation data may include, and/or be derived from, seismic data (e.g., fault properties such as type, angle, orientation, heave, vertical throw, horizontal throw, stratigraphic throw, strike-slip, dip slip, 2D horizon folds, 3D curvature, basement faults, regional stress regimes, tectonic basin history), vertical well log data (e.g., image log fracture interpretations, petrophysical data, wireline logs), horizontal well-log data (e.g., mud logs, completion design, vertical well spacing, horizontal well spacing, wellbore tortuosity, production data), and/or other data. The structural deformation data may quantify geostructural characteristics as a function of position in the subsurface region of interest.

In implementations, the structural deformation data may include, and/or be derived from, faults, folds, and/or other structural deformations. The structural deformations used to create the structural deformation data may be observable features in the surface or subsurface region of interest, including, for example, outcrops. The structural deformation data may include, and/or be derived from, outcrop data (e.g., fracture measurements, fold measurements, fault measurements, lithology analysis, etc.). The faults may be identified by fault properties, including, for example, type of fault, angle of fault, orientation, heave, vertical throw, horizontal throw, stratigraphic throw, strike-slip, dip slip, and/or other fault properties. The folds may be identified based on horizon curvature and/or other data.

Geophysical data may be obtained by sending energy into a subsurface region of interest using surface or subsurface sources and receiving the signal reflected off of a subsurface feature at surface or subsurface receivers. Zero-offset surface source-receiver pairs may send energy waves into the subsurface region of interest. Energy waves may reflect or refract off the subsurface feature. Source-receiver pairs may receive the reflected and refracted energy waves which may be processed and converted into seismic data. In some implementations, a surface or subsurface source may send subsurface energy into the subsurface, which may then be reflected and/or refracted by the subsurface features and may be recorded at the surface or subsurface receivers at various distances away from the source. Subsurface energy may include acoustic compressional or shear waves. For example, the surface or subsurface source may generate acoustic compressional or shear waves and direct them towards a subsurface region that includes various lithologies (e.g., underground rock structures). The seismic data may be generated from subsurface signals (e.g., the reflections of the subsurface energy off of the various subsurface lithologies) and received by sensors, such as geophones and/or other acoustic detectors. The seismic data may be stored in a data store and/or another source.

In implementations, the structural deformation data component 110 may be configured to generate structural deformation data. This may be accomplished by a physical computer processor. The structural deformation data may be generated by extracting, refining, or otherwise deriving the data from the seismic data, well data, and/or other data to quantify geostructural characteristics as a function of position in the subsurface region of interest. In implementations, the structural deformation data may be generated using structural seismic interpretations. In implementations, the structural deformation data may be generated by extracting, refining, or otherwise deriving the data from the seismic data, well data, horizon curvature data, and/or other data to quantify structural deformation characteristics as a function of position in the subsurface region of interest. In some implementations, the structural deformation data may be generated using a simulation model.

Subsurface lithology parameter component 112 may be configured to obtain subsurface lithology parameter data. The subsurface lithology parameter data may be obtained from the data store and/or another source. The subsurface lithology parameter data may be training subsurface lithology parameter data or target subsurface lithology parameter data. The training subsurface lithology parameter data may be used to train the initial fracture distribution grid model. The target subsurface lithology parameter data may be used to generate target fracture attribute data and/or natural fracture network attributes. The subsurface lithology parameter data may initially be collected and/or measured via sensors in the subsurface region of interest (e.g., field data) and/or be generated through the use of simulation models (e.g., synthetic data). The synthetic subsurface lithology parameter data may be stored. The stored synthetic subsurface lithology parameter data may be obtained and/or used as part of the training data.

The subsurface lithology parameters may include facies type, brittleness, heterogeneity, bed thickness, porosity, permeability, and/or other parameters. The subsurface lithology parameter data may quantify natural fracture network characteristics as a function of position in the subsurface region of interest.

In implementations, the subsurface lithology parameter component 112 may be configured to generate subsurface lithology-adjusted natural fracture parameter data. This may be accomplished by a physical computer processor. The subsurface lithology parameter data be generated by extracting, refining, or otherwise deriving the data from the seismic data, well data, and/or other data to quantify natural fracture network characteristics as a function of position in the subsurface region of interest. In some implementations, the subsurface lithology parameter data may be generated using a simulation model. In implementations, the subsurface lithology parameter data may be generated using petrophysical analysis.

Fracture attribute component 114 may be configured to obtain fracture attribute data. The fracture attribute data may be obtained from the data store and/or another source. The fracture attribute data may be training fracture attribute data or target fracture attribute data. The training fracture attribute data may be used to train the initial fracture distribution grid model. The target fracture attribute data may be generated using the trained fracture distribution grid model. The fracture attribute data may initially be collected and/or measured via sensors in the subsurface region of interest (e.g., field data) and/or be generated through the use of simulation models (e.g., synthetic data).

The fracture attributes may include fracture locations, fracture orientation, fracture nature, fracture aperture, fracture fill, fracture spacing, fracture intensity, fracture density, fracture plane size, fracture plane size distribution, fracture intensity per fracture set, fracture plane size distribution per fracture set, and/or other fracture attributes. The fracture plane size may include a length and a height value. The fracture attributes may be determined by correlating target lithology data, target subsurface lithology parameters, and an average distance from the fault/fold location. The fracture attribute data may specify fracture attribute values as a function of position in the subsurface region of interest. The fracture attribute data may be used in, for example, physics based geologic and reservoir simulation models.

In implementations, the training fracture attribute data may correspond to the training structural deformation data, training subsurface lithology parameter data, training structural deformation data, and/or other training input data. In some implementations, training fracture attribute data may be derived from the training input data using existing relationships between fracture attribute data and training structural deformation data, training subsurface lithology parameter data, training structural deformation data, and/or other training input data, including, for example, petrophysics, rock physics, and the like.

In implementations, fracture attribute component 114 may be configured to predict, determine, and/or generate target fracture attribute data. This may be accomplished by a physical computer processor. As discussed above, target fracture attribute data may be generated by applying the trained fracture distribution grid model to the target structural deformation data, target subsurface lithology parameter data, target structural deformation data, and/or other input data. The trained fracture distribution grid model can accurately estimate the target fracture attribute data using the target structural deformation data, target subsurface lithology parameter data, and/or target structural deformation data as input because the trained fracture distribution grid model has been "trained" or "conditioned." In implementations, the target fracture attribute data may be generated by updating fracture data to a single interpretation standard. In some implementations, a fracture intensity window may be used (e.g., per zone by tops, within a sliding window, and the like) to predict, determine, and/or generate the target fracture attribute data. Determining the target fracture attribute data may include correlating two or more of target structural deformation data, target subsurface lithology parameter data, and an average distance from a position corresponding to the target structural deformation data.

In implementations, the fracture attribute component 114 may be configured to chart and/or display the fracture attribute data as a fracture analysis grid.

Representation component 116 may be configured to chart and/or display the fracture attribute data as a fracture analysis grid. This may be charted and/or displayed on a graphical user interface. As used herein, charting may refer to a process in which a data set is correlated to one or more other data sets, for example, on a graphic plot, table, array, or other data object. In some examples, the charting may be performed by a processor and the output of the charting process may be stored in a data storage device and/or displayed in a graphical user interface. The fracture analysis grid may be a representation of the fracture attribute data and/or natural fracture network attributes as a function of position in the subsurface region of interest. The representation may use visual effects to display at least some of the fracture attribute data as a function of position in the subsurface region of interest. In some implementations, a visual effect may include a visual transformation of the representation. A visual transformation may include a visual change in how the representation is presented or displayed. In some implementations, a visual transformation may include a visual zoom, a visual filter, a visual rotation, and/or a visual overlay (e.g., text and/or graphics overlay). The visual effect may include using a temperature map, or other color coding, to indicate which positions in the subsurface region of interest have higher or lower values.

Figure 7:
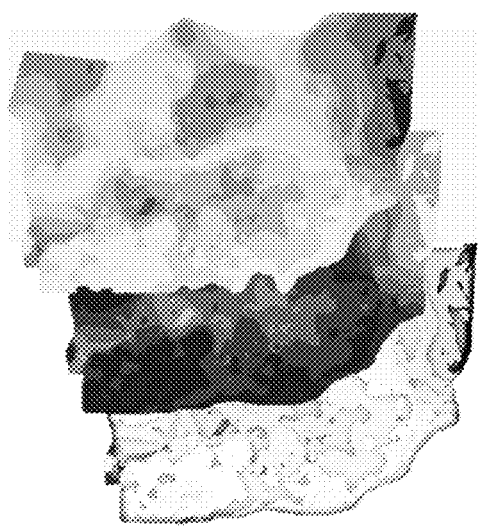
FIG. 7 illustrates an example representation of natural fracture network attributes in a subsurface region of interest, in accordance with some implementations.
Figure 7:
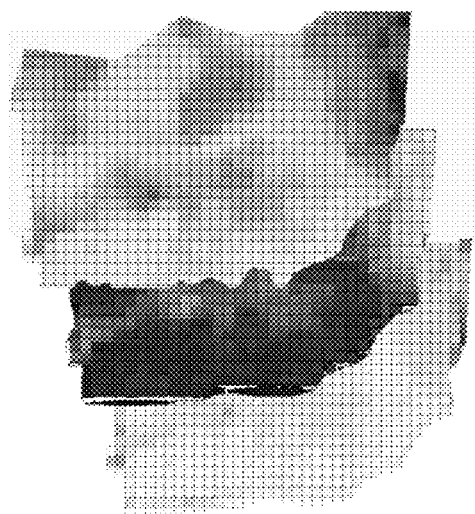
Figure 7:
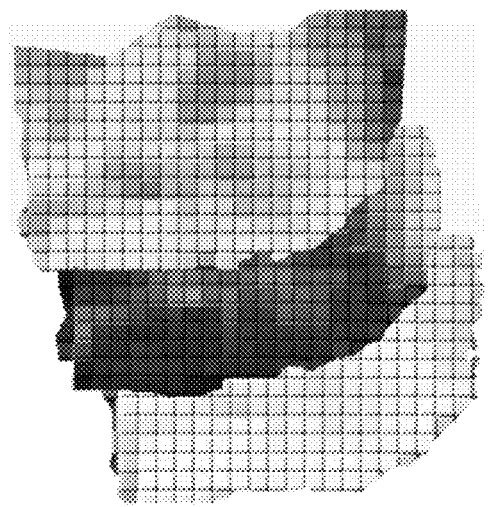

In some implementations, the fracture analysis grid may be refined to increase the resolution of the fracture attribute data as a function of position (e.g., instead of a single fracture attribute value covering 1,000 square miles, a single fracture attribute value covers 500 square miles, 100 square miles, and so on). For example, FIG. 7 illustrates three different resolutions of the subsurface region of interest. Grid 702 may correspond to a lowest resolution grid of the three grids (e.g., 1,000 square miles), grid 704 may correspond to a higher resolution grid than grid 702 (e.g., 500 square miles), and grid 706 may refer to the highest resolution grid of the three grids (e.g., 100 square miles).

In some implementations, representation component 116 may be configured to display the representation. The representation may be displayed on a graphical user interface and/or other displays. The representation may be used to more easily identify a subsurface fracture network in a subsurface region of interest. The subsurface fracture network may be used to analyze hydrocarbon resource volumes and estimate future production in a subsurface reservoir of interest.

In some implementations, server(s) 102, client computing platform(s) 104, and/or external resources 128 may be operatively linked via an electronic communication link. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include a processor configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, a processor 134, and/or another component. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may include non-transient electronic storage and/or non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include a virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include a physical computer processor, a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, and/or other components. Processor(s) 132 may be configured to execute components 108, 110, 112, 114, 116, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include a physical processor during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 132 includes multiple processing units, components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, components 108, 110, 112, 114, and/or 116 may be eliminated, and some or all of its functionality may be provided by other ones of components 108, 110, 112, 114, and/or 116. As an example, processor(s) 132 may be configured to execute an additional component that may perform some or all of the functionality attributed below to components 108, 110, 112, 114, and/or 116.

Figure 2:
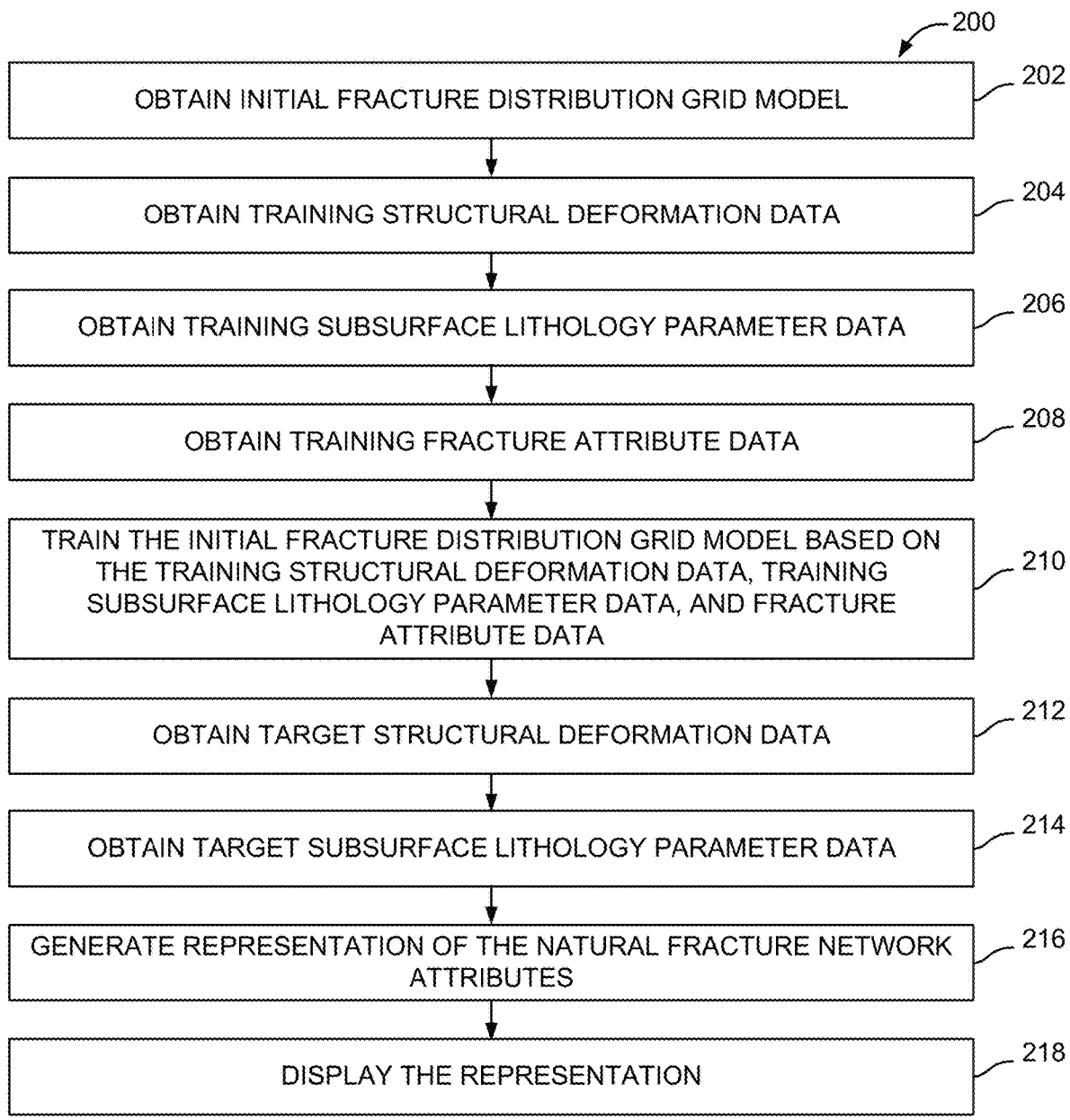
FIG. 2 is a flowchart of a method of identifying geostructural properties as a function of position in a subsurface region of interest, in accordance with some implementations.

FIG. 2 illustrates a method 200 for identifying geostructural properties as a function of position in the subsurface region of interest, in accordance with some implementations. The operations of method 200 presented below is intended to be illustrative. In some implementations, method 200 may be accomplished with an additional operation not described, and/or without one of the operations discussed. Additionally, the order in which the operations of method 200 is illustrated in FIG. 2 and described below is not intended to be limiting.

In some implementations, method 200 may be implemented in a processing device (e.g., a digital processor, a physical computer processor, an analog processor, a digital circuit designed to process information, an analog circuit designed to process information, a state machine, and/or other mechanisms for electronically processing information). The processing device may include a device executing some or all of the operations of method 200 in response to instructions stored electronically on an electronic storage medium. The processing device may include a device configured through hardware, firmware, and/or software to be specifically designed for execution of one of the operations of method 200.

An operation 202 may include obtaining an initial fracture distribution grid model. The initial fracture distribution grid model may be "untrained" or "unconditioned," indicating it may not estimate an output based on the input as accurately as a "trained" or "conditioned" model. In some implementations, an initial fracture distribution grid model may be trained into a trained fracture distribution grid model. The initial fracture distribution grid model may be trained using training data. The initial fracture distribution grid model may include a machine learning model. The machine learning model may include a random forest, a convolutional neural network, a regression, and/or other machine learning models. Operation 202 may be performed by a hardware processor configured by machine-readable instructions including a component that is the same as or similar to fracture distribution grid model component 108, in accordance with some implementations.

An operation 204 may include obtaining training structural deformation data. The training structural deformation data may quantify geostructural characteristics as a function of position in the subsurface region of interest. In implementations, the training structural deformation data may include seismic data, stress data, tectonic history data. In some implementations, the training structural deformation data may include well log data acquired from multiple well logs. Operation 204 may be performed by a hardware processor configured by machine-readable instructions including a component that is the same as or similar to structural deformation data component 110, in accordance with some implementations.

An operation 206 may include obtaining training subsurface lithology parameter data. The training subsurface lithology parameter data may quantify lithological characteristics as a function of position in the subsurface region of interest. The training subsurface lithology parameter data may include a facies type, lithology, bedding character, porosity, permeability, and/or other subsurface lithology parameter data. Operation 206 may be performed by a hardware processor configured by machine-readable instructions including a component that is the same as or similar to subsurface lithology parameter component 112, in accordance with some implementations.

An operation 208 may include obtaining training fracture attribute data and training structural deformation data. The training fracture attribute data may specify fracture attribute values as a function of position in the subsurface region of interest. The training structural deformation data may quantify structural deformation characteristics as a function of position in the subsurface region of interest. In implementations, the training structural deformation data may include outcrop and/or seismic data. The outcrop and/or seismic data may include a fault type, fault angle, orientation, heave, vertical throw, horizontal throw, stratigraphic throw, and/or other seismic data. In some implementations, the training structural deformation data may include well log data acquired from multiple well logs. Operation 208 may be performed by a hardware processor configured by machine-readable instructions including a component that is the same as or similar to structural deformation component 110 and fracture attribute component 114, in accordance with some implementations.

An operation 210 may include training the initial fracture distribution grid model based on the training structural deformation data, training subsurface lithology parameter data, training structural deformation data, and training fracture attribute data. The trained fracture distribution grid model may be able to predict natural fracture network attributes. In some implementations, the trained fracture distribution grid model may be able to predict natural fracture network attributes as a function of fracture intensity. In some implementations, the trained fracture distribution grid model may be able to predict natural fracture network attributes as a function of a correlation between a distance from a fault location and a corresponding fracture intensity. Operation 210 may be performed by a hardware processor configured by machine-readable instructions including a component that is the same as or similar to fracture distribution grid model component 108, in accordance with some implementations.

In some implementations, operation 210 may include obtaining a surface curvature within the training subsurface region. The initial fracture distribution grid model may be trained based on the training structural deformation data, training subsurface lithology parameter data, training fracture attribute data, and/or the surface curvature. The trained fracture distribution grid model may be able to predict natural fracture network attributes as a function of a correlation between a distance from a fault location and a corresponding fracture intensity. Operation 210 may be performed by a hardware processor configured by machine-readable instructions including a component that is the same as or similar to fracture distribution grid model component 108, in accordance with some implementations.

An operation 212 may include obtaining target structural deformation data. The target structural deformation data may quantify geostructural characteristics as a function of position in the subsurface region of interest. The target structural deformation data may quantify structural deformation characteristics as a function of position in the subsurface region of interest. In implementations, the target structural deformation data may include seismic data, well log data, and/or other data. The structural deformations may include faults, folds, and/or other structural deformations. The structural deformations may be observable features in the surface region of interest, including, for example, outcrops. The structural deformation data may include, and/or be derived from, outcrop data (e.g., fracture measurements, fold measurements, fault measurements, lithology analysis, etc.). Operation 212 may be performed by a hardware processor configured by machine-readable instructions including a component that is the same as or similar to structural deformation data component 110, in accordance with some implementations.

An operation 214 may include obtaining target subsurface lithology parameter data. The target subsurface lithology parameter data may quantify lithological characteristics as a function of position in the subsurface region of interest. The target subsurface lithology parameters may include a facies type, lithology, bedding character, porosity, permeability, and/or other subsurface lithology parameters. Operation 214 may be performed by a hardware processor configured by machine-readable instructions including a component that is the same as or similar to subsurface lithology parameter component 112, in accordance with some implementations.

An operation 216 may include generating a representation of the natural fracture network attributes as a function of position in the subsurface region of interest. The representation may be generated using visual effects to display at least some of the fracture attribute data as a function of position in the subsurface region of interest. In some implementations, the representation may be a fracture analysis grid. Operation 216 may be performed by a hardware processor configured by machine-readable instructions including a component that is the same as or similar to representation component 116, in accordance with some implementations.

An operation 218 may include displaying the representation. Operation 218 may be performed by a hardware processor configured by machine-readable instructions including a component that is the same as or similar to representation component 116, in accordance with some implementations.

Figure 3:
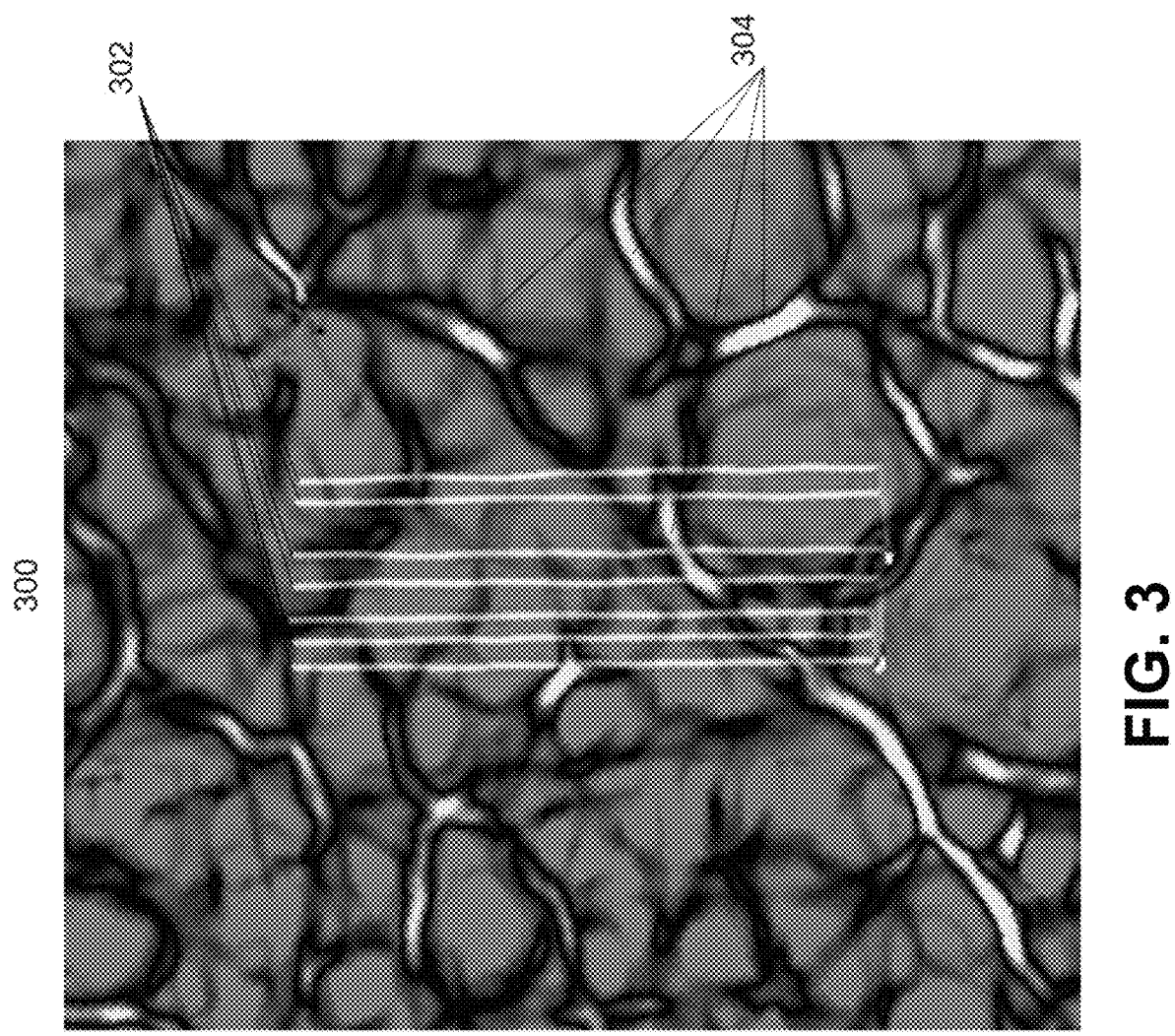
FIG. 3 illustrates an example representation of natural fracture network attributes in a subsurface region of interest, in accordance with some implementations.
Figure 4:
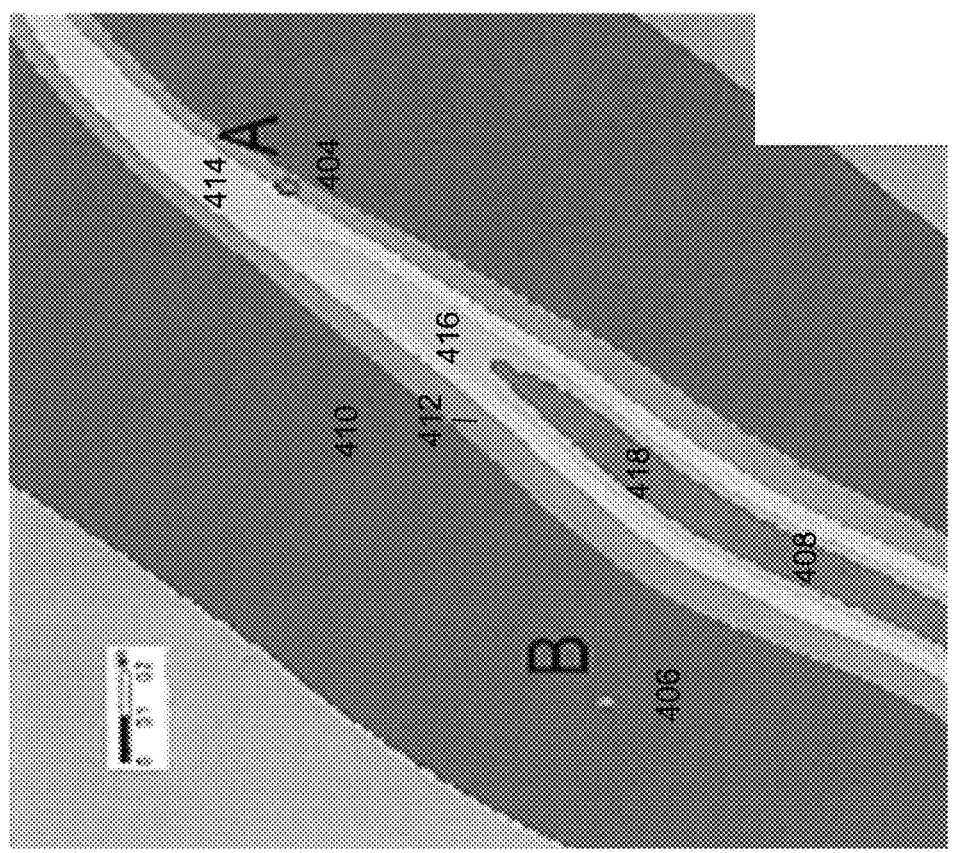
FIG. 4 illustrates an example representation of fracture intensity in a subsurface region of interest with a fault and multiple wells, in accordance with some implementations.
Figure 4:
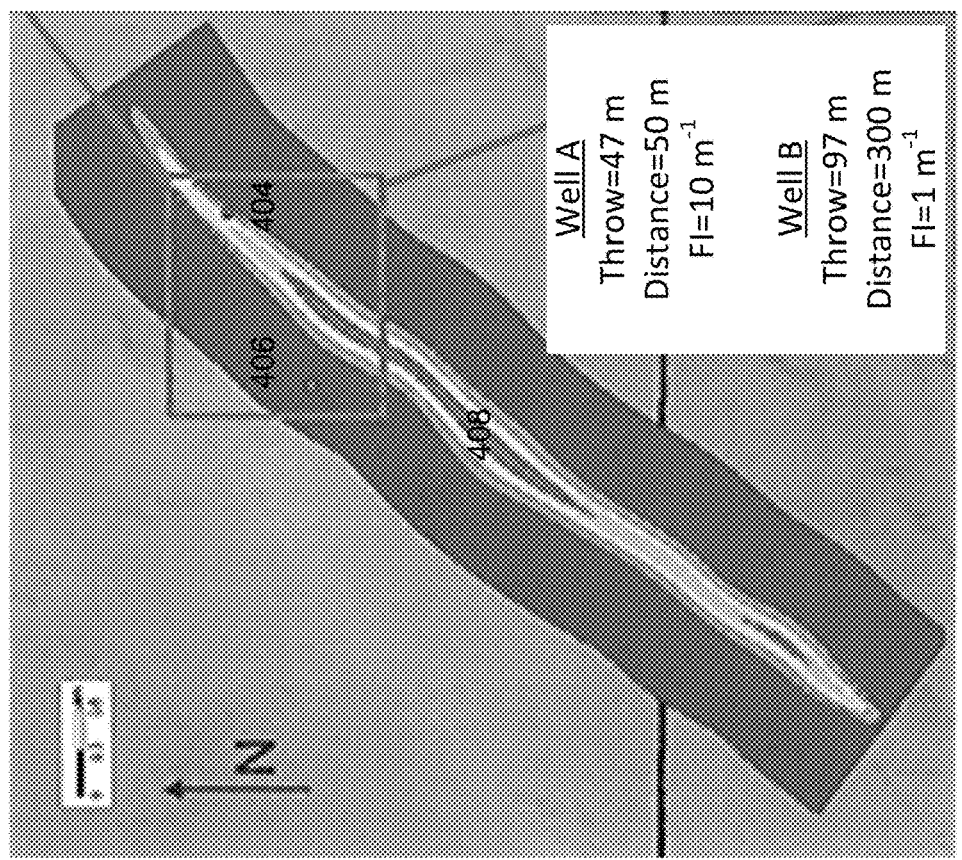

FIG. 3 illustrates an example representation of seismic analysis in the subsurface region of interest with structural deformation features and multiple wells, in accordance with some implementations. As illustrated, subsurface region of interest 300 may include seven horizontal wells 302 in the map view. Segments 304 represent structural deformation features such as faults and folds in the subsurface region of interest. It should be appreciated that lines are not connected to every segment for purposes of clarity in the illustration. FIG. 4 further explains the interpretation example of a single 304 fault feature.

FIG. 4 illustrates an example representation of fracture intensity in a subsurface region of interest with a fault and multiple wells, in accordance with some implementations. As illustrated, subsurface region of interest 400 may include two wells 404 and 406 that lie along fault 408. Well 404 has corresponding structural deformation data (e.g., throw—47 m), corresponding structural deformation data (e.g., distance—50 m), and corresponding fracture attribute data (e.g., fracture intensity—10 m$^{-1}$). Subsurface region of interest 402 may be a zoomed-in view of subsurface region of interest 400, such as the boxed region of subsurface region of interest 400.

Well 406 has corresponding structural deformation data (e.g., throw—97 m), corresponding structural deformation data (e.g., distance—300 m), and corresponding fracture attribute data (e.g., fracture intensity—1 m$^{-1}$). Fracture intensity of fault 408 may be depicted from least intensity (e.g., 410), to less intensity (e.g., 412), to medium intensity (e.g., 414), to more intensity (e.g., 416), to most intensity (e.g., 418).

Figure 5:
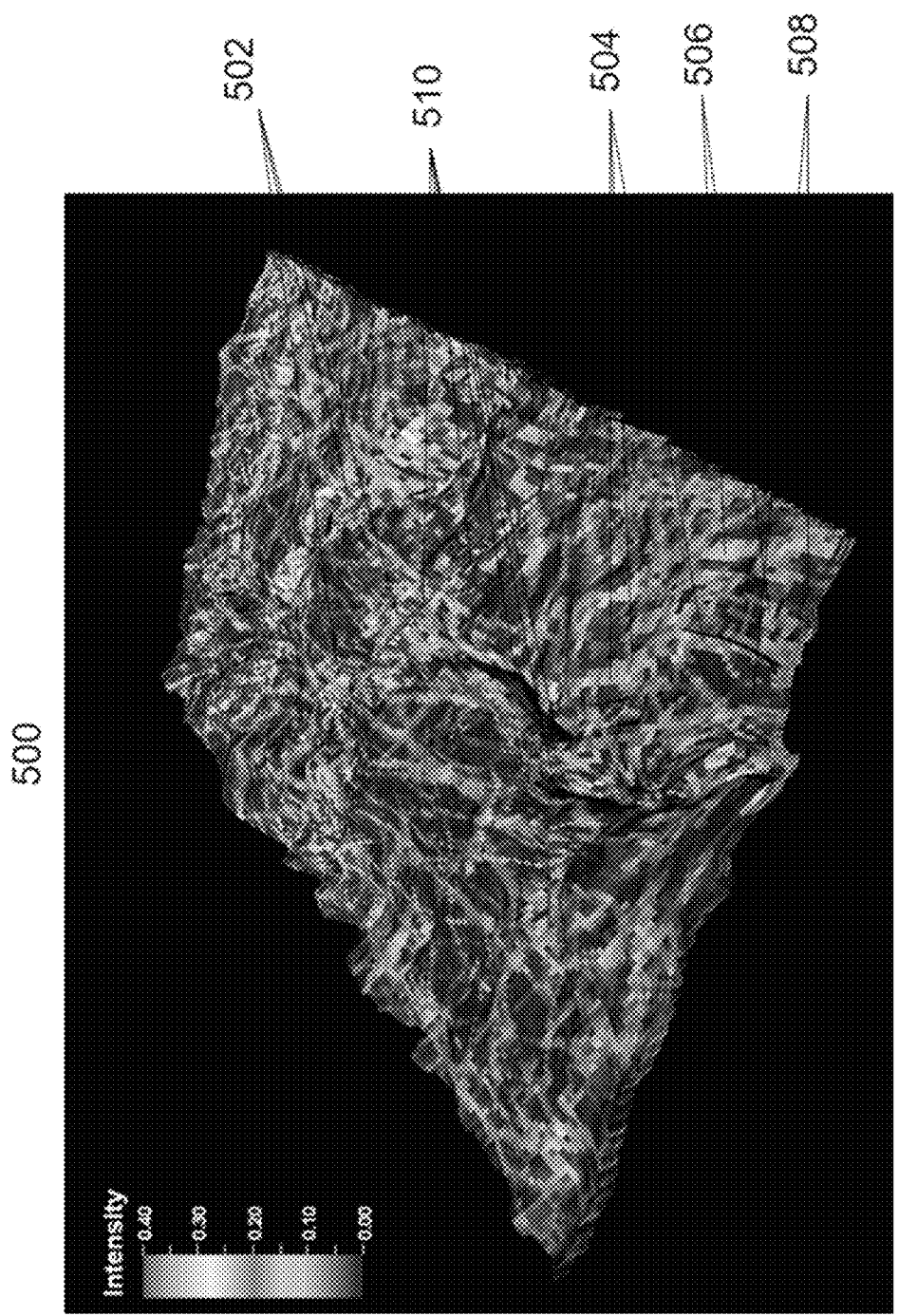
FIG. 5 illustrates an example representation of fracture attributes in a subsurface region of interest, in accordance with some implementations.

FIG. 5 illustrates an example representation of fracture attributes in a subsurface region of interest, in accordance with some implementations. In implementations, the training fracture attribute data may correspond to the training structural deformation data as represented in FIG. 4. Subsurface region of interest 500 may represent a 3D view of the subsurface region of interest of FIG. 3. The colors represent fracture intensity where color 502 depicts the most intensity, color 504 depicts medium intensity, color 506 depicts the least intensity, and color 508 depicts no intensity and no fractures. It should be appreciated that lines are not connected to every color alteration for purposes of clarity in the illustration.

Figure 6:
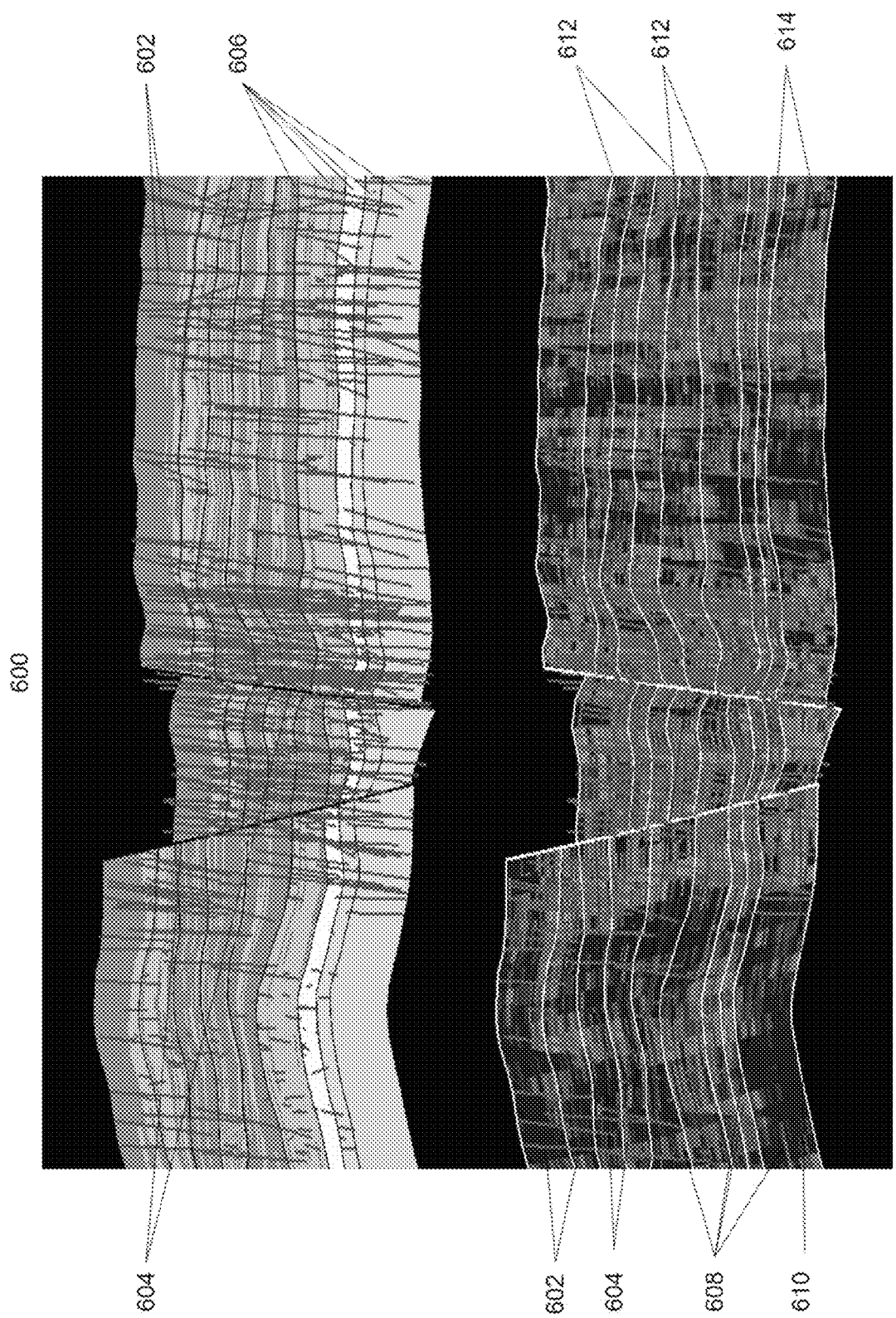
FIG. 6 illustrates an example representation of fracture attributes in a subsurface region of interest, in accordance with some implementations.

FIG. 6 illustrates an example representation of fracture attributes in a subsurface region of interest, in accordance with some implementations. Subsurface region of interest 600 may represent the cross-sectional view of the subsurface region of interest of FIG. 3. The 602 lines represent a discrete fracture network (DFN). In implementations, the fracture data may correspond to the training structural deformation data and subsurface lithology parameters. Fault planes 604 may represent an example of structural deformation data. Background color variations 606 may represent subsurface lithology parameters. The color 608 represent fracture intensity as shown on the cross-sectional view of the subsurface region of interest of FIG. 5 where color 610 depicts the most intensity, color 612 depicts medium intensity, color 614 depicts the least intensity, and color 616 depicts no intensity and no fractures. It should be appreciated that lines are not connected to every discrete fracture or color alteration for purposes of clarity in the illustration.

FIG. 7 illustrates an example representation of natural fracture network attributes in a subsurface region of interest, in accordance with some implementations. Grids 702 represent a coarse resolution of the subsurface region of interest. Grids 702 may be generated based on fracture well data, lithology from petrophysics, bedding from petrophysics, structural seismic attributes, structural seismic interpretations, and/or outcrop data. Grids 704 represent a finer resolution than grids 702 of the subsurface region of interest. Grids 704 may be a finer resolution than grids 702 based on additional seismic data and well data, including subseismic faults from dynamic time warping (DTW), subseismic faults from horizontal wells, seismic faults from AI, high resolution lithology from DTW, and geomodel properties for non-linear regressions. Grids 706 may be a finer resolution than grids 704. Grids 706 may be a finer resolution than grids 704 based on additional seismic data and well data, including tectonic models and stress models. The tectonic model may be used for fracture set timing and evaluating stress regimes.

Figure 8:
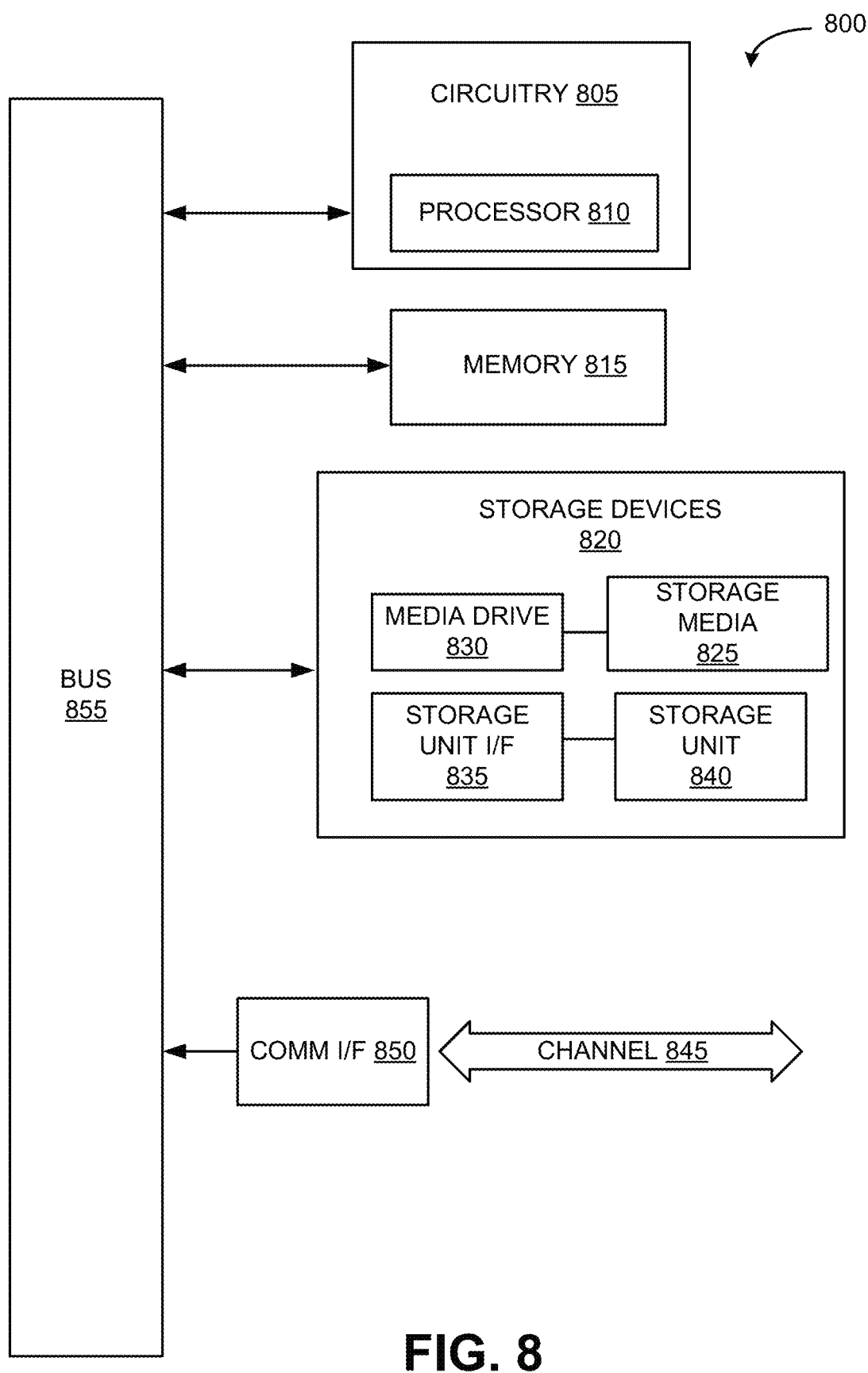
FIG. 8 illustrates example computing component, in accordance with some implementations.

FIG. 8 illustrates example computing component 800, which may in some instances include a processor/controller resident on a computer system (e.g., server system 106). Computing component 800 may be used to implement various features and/or functionality of implementations of the systems, devices, and methods disclosed herein. With regard to the above-described implementations set forth herein in the context of systems, devices, and methods described with reference to FIGS. 1 through 7, including implementations involving server(s) 102, it may be appreciated additional variations and details regarding the functionality of these implementations that may be carried out by computing component 800. In this connection, it will also be appreciated upon studying the present disclosure that features and aspects of the various implementations (e.g., systems) described herein may be implemented with respect to other implementations (e.g., methods) described herein without departing from the spirit of the disclosure.

As used herein, the term component may describe a given unit of functionality that may be performed in accordance with some implementations of the present application. As used herein, a component may be implemented utilizing any form of hardware, software, or a combination thereof. For example, a processor, controller, ASIC, PLA, PAL, CPLD, FPGA, logical component, software routine, or other mechanism may be implemented to make up a component. In implementation, the various components described herein may be implemented as discrete components or the functions and features described may be shared in part or in total among components. In other words, it should be appreciated that after reading this description, the various features and functionality described herein may be implemented in any given application and may be implemented in separate or shared components in various combinations and permutations. Even though various features or elements of functionality may be individually described or claimed as separate components, it will be appreciated that upon studying the present disclosure that these features and functionality may be shared among a common software and hardware element, and such description shall not require or imply that separate hardware or software components are used to implement such features or functionality.

Where components of the application are implemented in whole or in part using software, in implementations, these software elements may be implemented to operate with a computing or processing component capable of carrying out the functionality described with respect thereto. One such example computing component is shown in FIG. 8. Various implementations are described in terms of example computing component 800. After reading this description, it will be appreciated how to implement example configurations described herein using other computing components or architectures.

Referring now to FIG. 8, computing component 800 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 800 is specifically purposed.

Computing component 800 may include, for example, a processor, controller, control component, or other processing device, such as a processor 810, and such as may be included in circuitry 805. Processor 810 may be implemented using a special-purpose processing engine such as, for example, a microprocessor, controller, or other control logic. In the illustrated example, processor 810 is connected to bus 855 by way of circuitry 805, although any communication medium may be used to facilitate interaction with other components of computing component 800 or to communicate externally.

Computing component 800 may also include a memory component, simply referred to herein as main memory 815. For example, random access memory (RAM) or other dynamic memory may be used for storing information and instructions to be executed by processor 810 or circuitry 805. Main memory 815 may also be used for storing temporary variables or other intermediate information during execution of instructions to be executed by processor 810 or circuitry 805. Computing component 800 may likewise include a read only memory (ROM) or other static storage device coupled to bus 855 for storing static information and instructions for processor 810 or circuitry 805.

Computing component 800 may also include various forms of information storage devices 820, which may include, for example, media drive 830 and storage unit interface 835. Media drive 830 may include a drive or other mechanism to support fixed or removable storage media 825. For example, a hard disk drive, a floppy disk drive, a magnetic tape drive, an optical disk drive, a CD or DVD drive (R or RW), or other removable or fixed media drive may be provided. Accordingly, removable storage media 825 may include, for example, a hard disk, a floppy disk, magnetic tape, cartridge, optical disk, a CD or DVD, or other fixed or removable medium that is read by, written to, or accessed by media drive 830. As these examples illustrate, removable storage media 825 may include a computer usable storage medium having stored therein computer software or data.

In alternative implementations, information storage devices 820 may include other similar instrumentalities for allowing computer programs or other instructions or data to be loaded into computing component 800. Such instrumentalities may include, for example, fixed or removable storage unit 840 and storage unit interface 835. Examples of such removable storage units 840 and storage unit interfaces 835 may include a program cartridge and cartridge interface, a removable memory (for example, a flash memory or other removable memory component) and memory slot, a PCM-CIA slot and card, and other fixed or removable storage units 840 and storage unit interfaces 835 that allow software and data to be transferred from removable storage unit 840 to computing component 800.

Computing component 800 may also include a communications interface 850. Communications interface 850 may be used to allow software and data to be transferred between computing component 800 and external devices. Examples of communications interface 850 include a modem or soft-modem, a network interface (such as an Ethernet, network interface card, WiMedia, IEEE 802.XX, or other interface), a communications port (such as for example, a USB port, IR port, RS232 port Bluetooth® interface, or other port), or other communications interface. Software and data transferred via communications interface 850 may typically be carried on signals, which may be electronic, electromagnetic (which includes optical) or other signals capable of being exchanged by a given communications interface 850. These signals may be provided to/from communications interface 850 via channel 845. Channel 845 may carry signals and may be implemented using a wired or wireless communication medium. Some non-limiting examples of channel 845 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 815, storage unit interface 835, removable storage media 825, and channel 845. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 800 or a processor to perform features or functions of the present application as discussed herein.

Various implementations have been described with reference to specific example features thereof. It will, however, be evident that various modifications and changes may be made thereto without departing from the broader spirit and scope of the various implementations as set forth in the appended claims. The specification and figures are, accordingly, to be regarded in an illustrative rather than a restrictive sense.

Although described above in terms of various example implementations and implementations, it should be understood that the various features, aspects, and functionality described in one of the individual implementations are not limited in their applicability to the particular implementation with which they are described, but instead may be applied, alone or in various combinations, to other implementations of the present application, whether or not such implementations are described and whether or not such features are presented as being a part of a described implementation. Thus, the breadth and scope of the present application should not be limited by any of the above-described example implementations.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various implementations set forth herein are described in terms of example block diagrams, flow charts, and other illustrations. As will be appreciated after reading this document, the illustrated implementations and their various alternatives may be implemented without confinement to the illustrated examples. For example, block diagrams and their accompanying description should not be construed as mandating a particular architecture or configuration.

What is claimed is:

1. A computer-implemented method for identifying and displaying geostructural properties as a function of lithology, horizons, and faults interpreted from well and seismic data, the method being implemented in a computer system that comprises a physical computer processor and non-transient electronic storage, the method comprising:
obtaining an initial fracture distribution grid model from a data store;

obtaining, from the data store, training structural deformation data, wherein the training structural deformation data quantifies one of geostructural characteristics and structural deformation characteristics as a function of position in the subsurface region of interest;

obtaining, from the data store, training subsurface lithology parameter data, wherein the training subsurface lithology parameter data quantify lithological characteristics as a function of position in the subsurface region of interest;

obtaining, from the data store, training fracture attribute data, wherein the training fracture attribute data specify fracture attribute values as a function of position in the subsurface region of interest;

training, with the physical computer processor, the initial fracture distribution grid model to generate a trained fracture distribution grid model predicting natural fracture network attribute values based on the training structural deformation data, the training subsurface lithology parameter data, and the training fracture attribute data; and determining, with the trained fracture distribution grid model, predicted natural fracture network attribute values as a function of position in the subsurface region of interest based on target structural deformation data, target subsurface lithology parameter data, and target fracture attribute data, wherein determining predicted natural fracture network attribute values comprises correlating the target structural deformation data, the target subsurface lithology parameter data, and an average distance from a fault/fold location.

2. The method of claim 1, wherein the training structural deformation data comprise seismic data.

3. The method of claim 2, wherein the seismic data comprises one of a fault type, fault angle, orientation, heave, vertical throw, horizontal throw, and stratigraphic throw.

4. The method of claim 2, wherein the training subsurface lithology parameter data comprise one of a facies type, lithology, bedding character, porosity, and permeability.

5. The method of claim 1, wherein the training structural deformation data comprise well log data acquired from multiple well logs.

6. The method of claim 1, further comprising training, with the physical computer processor, the initial fracture distribution grid model to generate a trained fracture distribution grid model predicting the natural fracture network attribute values as a function of position based on the fracture intensity within the training subsurface region.

7. The method of claim 6, further comprising training, with the physical computer processor, the fracture distribution grid model to generate a trained fracture distribution grid model predicting the natural fracture network attribute values as a function of position based on a correlation between a distance from the fault location and the fracture intensity.

8. The method of claim 1, further comprising:
obtaining, from the data store, a surface curvature within the training subsurface region; and
training, with the physical computer processor, the initial fracture distribution grid model to generate a trained fracture distribution grid model predicting the natural fracture network attribute values as a function of position based on the surface curvature.

9. The method of claim 1, wherein the training subsurface region comprises observable lithology, bedding character, faults/folds, and fractures.

10. The method of claim 1, wherein the fracture distribution grid models comprise a machine learning model.

11. The method of claim 10, wherein the machine learning model comprises one of a random forest, a convolutional neural network, and a regression.

12. The method of claim 1, wherein the computer system further comprises a graphical user interface, and the computer-implemented method further comprises:
obtaining, from the data store, target structural deformation data, wherein the target structural deformation data quantifies one of geostructural characteristics and structural deformation characteristics as a function of position in the subsurface region of interest;
obtaining, from the data store, target subsurface lithology parameter data, wherein the target subsurface lithology parameter data quantify lithological characteristics as a function of position in the subsurface region of interest;
generating, with the trained fracture distribution grid model, predicted natural fracture network attribute values within the subsurface region of interest as a function of position in the subsurface region of interest based on the target structural deformation data, and the target subsurface lithology parameter data; and
displaying, on the graphical user interface, the predicted natural fracture network attribute values as a predicted fracture analysis grid.

13. A computer-implemented method for identifying and displaying geostructural properties as a function of seismic horizon and fault structural deformation data, the method being implemented in a computer system that comprises a physical computer processor, non-transient electronic storage, and a graphical user interface, the method comprising:
obtaining a trained fracture distribution grid model from a data store;
obtaining, from the data store, target structural deformation data, wherein the target structural deformation data quantifies one of geostructural characteristics and structural deformation characteristics as a function of position in the subsurface region of interest;
obtaining, from the data store, target subsurface lithology parameter data, wherein the target subsurface lithology parameter data quantify lithological characteristics as a function of position in the subsurface region of interest;
determining, with the trained fracture distribution grid model, predicted natural fracture network attribute values as a function of position in the subsurface region of interest based on the target structural deformation data, the target subsurface lithology parameter data, and target fracture attribute data, wherein determining predicted natural fracture network attribute values comprises correlating the target structural deformation data, the target subsurface lithology parameter data, and an average distance from a fault/fold location; and
charting, on the graphical user interface, the predicted natural fracture network attribute values as a predicted fracture analysis grid.

14. The method of claim 13, further comprising training, with the physical computer processor, the trained fracture distribution grid model to predict the natural fracture network attribute values as a function of position based on the fracture spacing/density/intensity within a training subsurface region.

15. The method of claim 14, further comprising training, with the physical computer processor, the fracture distribution grid model to predict the natural fracture network attribute values as a function of position based on a correlation between a distance from a fault/fold location and a fracture intensity of a training subsurface region.

16. The method of claim 13, wherein the subsurface region of interest encompasses multiple well sites.

17. The method of claim 13, wherein the fracture distribution grid model comprises a machine learning model.

18. A system for identifying fracture attribute values as a function of position in the subsurface region of interest, the system comprising:
- a data store;
- a graphical user interface; and
- a physical computer processor configured by machine readable instructions to:
  - obtain a trained fracture distribution grid model from the data store;
  - obtain, from the data store, target structural deformation data, wherein the target structural deformation data quantifies one of geostructural characteristics and structural deformation characteristics as a function of position in the subsurface region of interest;
  - obtain, from the data store, target subsurface lithology parameter data, wherein the target subsurface lithology parameter data quantify lithological characteristics as a function of position in the subsurface region of interest;
  - determine, with the trained fracture distribution grid model, predicted fracture attribute values as a function of position in the subsurface region of interest based on the target structural deformation data, the target subsurface lithology parameter data, and target fracture attribute data, wherein determining predicted natural fracture network attribute values comprises correlating the target structural deformation data, the target subsurface lithology parameter data, and an average distance from a fault/fold location; and
  - display, on the graphical user interface, the predicted fracture attribute values as a predicted fracture analysis grid.

19. A non-transitory computer-readable storage medium having instructions embodied thereon, the instructions being executable by a physical computer processor to perform a method for identifying and displaying geostructural properties as a function of seismic horizon and fault structural deformation data, the method comprising:
- obtaining a trained fracture distribution grid model from a data store;
- obtaining, from the data store, target structural deformation data, wherein the target structural deformation data quantifies one of geostructural characteristics and structural deformation characteristics as a function of position in the subsurface region of interest;
- obtaining, from the data store, target subsurface lithology parameter data, wherein the target subsurface lithology parameter data quantify lithological characteristics as a function of position in the subsurface region of interest; and
- determining, with the trained fracture distribution grid model, predicted fracture attribute values as a function of position in the subsurface region of interest based on the target structural deformation data, the target subsurface lithology parameter data, and target fracture attribute data, wherein determining predicted natural fracture network attribute values comprises correlating the target structural deformation data, the target subsurface lithology parameter data, and an average distance from a fault/fold location.

* * * * *